United States Patent [19]

Bell et al.

[11] Patent Number: 4,719,625
[45] Date of Patent: Jan. 12, 1988

[54] METHOD OF RECOVERING FROM TRANSMISSION ERRORS IN A LOCAL AREA NETWORK BY TRANSMITTING AND RECEIVING SILENCE ON ALL NETWORK PORTS

[75] Inventors: John L. Bell, Escondido; Thomas J. Dineen; Dennis J. Mahon, both of San Diego, all of Calif.

[73] Assignee: Unisys Corporation, Detroit, Mich.

[21] Appl. No.: 843,399

[22] Filed: Mar. 24, 1986

[51] Int. Cl.$^4$ .................. G08C 25/00; G06F 11/20
[52] U.S. Cl. .......................... 371/11; 370/16; 370/86
[58] Field of Search .............. 371/11, 62; 370/15, 370/16, 86, 88; 340/825.05, 825.16

[56] References Cited

U.S. PATENT DOCUMENTS

| | | | |
|---|---|---|---|
| 4,516,121 | 5/1985 | Moriyama | 371/62 X |
| 4,519,070 | 5/1985 | Bell | 370/88 |
| 4,538,264 | 8/1985 | Bahr | 371/11 X |
| 4,542,496 | 9/1985 | Takeyama | 340/825.05 X |
| 4,633,246 | 12/1986 | Jones | 340/825.05 |

Primary Examiner—Jerry Smith
Assistant Examiner—Robert W. Beausoliel, Jr.
Attorney, Agent, or Firm—Charles J. Fassbender; L. Joseph Marhoefer

[57] ABSTRACT

A method of recovering from a transmission error in a station having first and second input-output ports which are respectively coupled to two other stations in a communication network includes the steps of: receiving on the first port, messages which are separated by idle characters and regenerating same on the second port; detecting the error during the receiving step; and responding to the detection of the error by (a) transmitting silence on both the first and second ports and (b) waiting for the receipt of silence on the ports, prior to passing any further messages through the station.

11 Claims, 3 Drawing Figures

METHOD OF RECOVERING FROM TRANSMISSION ERRORS IN A LOCAL AREA NETWORK BY TRANSMITTING AND RECEIVING SILENCE ON ALL NETWORK PORTS

BACKGROUND OF THE INVENTION

This invention relates to local area networks; and in particular it relates to methods of recovering from various errors that occur in the messages that are transmitted through such networks.

Basically, a local area network is comprised of a plurality of stations, each of which have two input-output (I/O) ports that are intercoupled in a loop. That is, one I/O port of station #1 is coupled to one I/O port of station #2; the other I/O port of station #2 is coupled to one I/O port of station #3; ... etc.; and the second I/O port of the last station is coupled to the second I/O port of the first station. Messages which are spaced by idle characters are normally sent around the loop through all the stations in one direction. If, however, the coupling between two stations breaks, then the messages are "looped-back" at the breakpoint through all the stations in the opposite direction.

In the prior art, a network of this type is described, for example, in the U.S. Pat. No. 4,519,070 issued May 21, 1985 to John L. Bell and assigned to the present assignee. This patent describes and claims a method of initializing the transmission of messages through the network starting from a state in which all of the stations are powered on one-at-a-time in a random sequence. Also, the patent describes a method of rerouting the messages through the stations when the coupling between two stations breaks.

However, many types of error conditions can occur in a local area network besides a broken interstation coupling, and these errors are not considered in the Bell patent. For example, one of the stations can become "stuck" in a particular state in which it continuously sends messages or idle characters and never stops. Also, a station may erroneously send messages in nonconformance with some pre-established format. Such transmission errors typically are very infrequent, but when they do occur they render the entire network inoperable if no corrective action is taken.

Accordingly, a primary object of the invention is to provide a method of operating a station in a local area network in which transmission errors of the above type, and others, are detected and recovered from.

BRIEF SUMMARY OF THE INVENTION

With the present invention, the above object of recovering from transmission errors from a station having first and second I/O ports which are respectively coupled to two other stations in a local area network is achieved by the steps of:
  receiving on the first port, messages which are separated by idle characters and regenerating same on the second port;
  detecting the error during the receiving step; and
  responding to the detection of the error by (a) transmitting silence on both the first and second ports and (b) waiting for a predetermined response on the ports to the transmitting of the silence, prior to passing any further messages through the station.

One preferred response is receiving silence on both the first and second ports; while another preferred response is receiving silence on one of the ports and continuously receiving any signal except silence on the other port for a selected time interval.

Only after a proper response to the transmission of silence is received does a station attempt to recouple itself to its two neighbor stations. This insures that the paths for the messages through the network re-form in the same fashion as if the stations of the network had all just powered on.

With this invention, a wide variety of errors can be recovered from including the continuous transmission of idle characters, the continuous transmission of a message, the interruption of either the idle characters or messages with silence, and the nonconformance of a message to a pre-established format.

BRIEF DESCRIPTION OF THE DRAWINGS

Various features and advantages of the invention are described in the Detailed Description in conjunction with the accompanying drawings wherein.

DETAILED DESCRIPTION OF THE INVENTION

Figure 1:
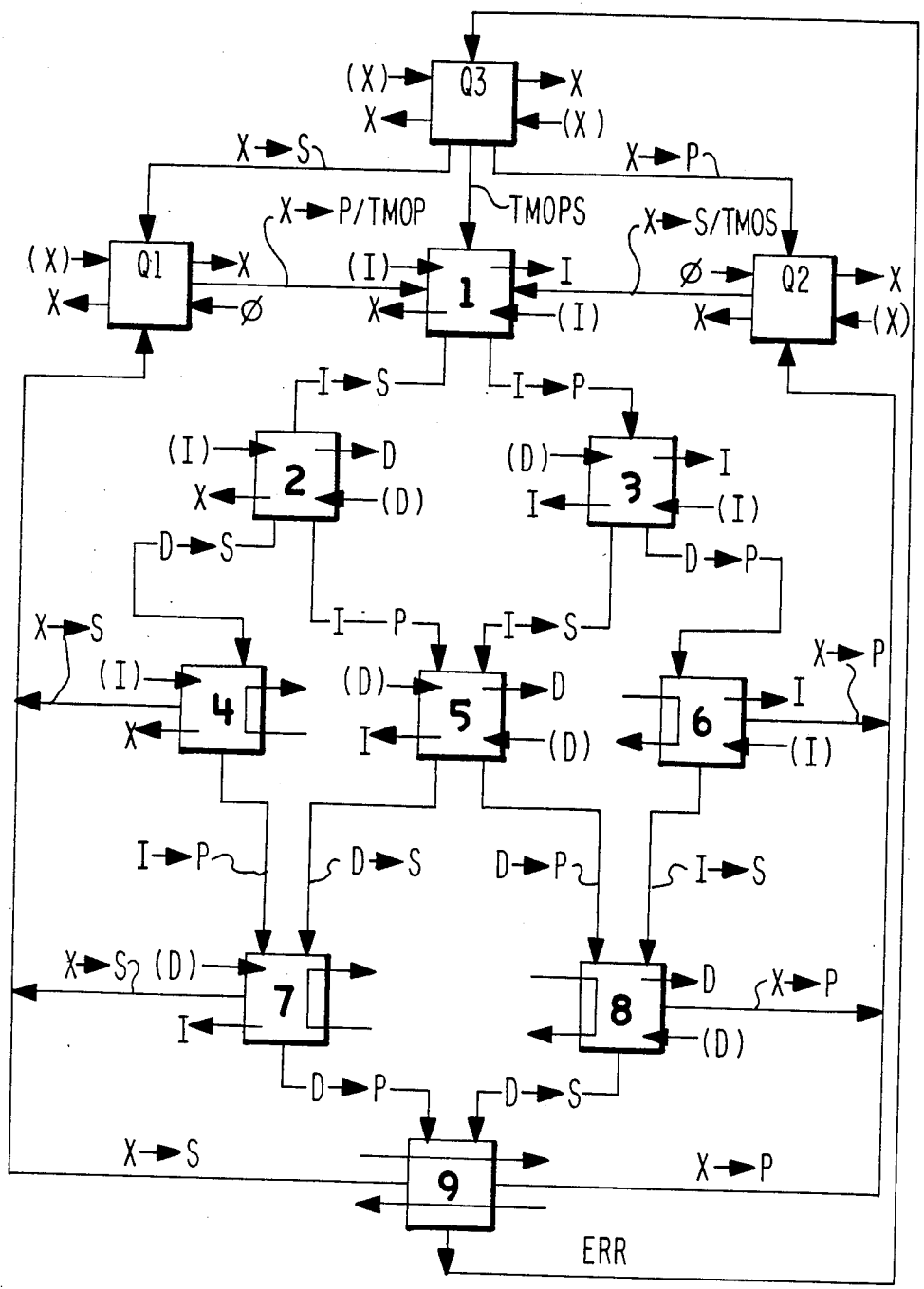
FIG. 1 is a state diagram which illustrates the operation of each station in the local area network in accordance with the invention.

Reference should now be made to FIG. 1 which shows a state diagram for each station in the disclosed communication network. In this diagram, each square represents a state. States 1 thru 9 operate to connect a station to its adjacent stations; whereas states Q1, Q2, and Q3 operate to disconnect a station from its adjacent stations.

Each square of FIG. 1 has one arrow which enters from the lefthand side and one arrow which exits from that same side. This entering arrow represents a station's primary input terminal, and this exiting arrow represents its secondary output terminal. Together, these two arrows comprise one input-output port of the station.

Similarly, each square has one arrow which exits from the righthand side and one arrow which enters from that same side. This exiting arrow represents a station's primary output terminal, and this entering arrow represents its secondary input terminal. Together, these two terminals comprise another input-output port of the station.

Adjacent each of the output terminals is a symbol such as I, D, and X. These symbols indicate what is being transmitted on the output terminal. Symbol I indicates idle characters are being transmitted, symbol D indicates delimiter characters are being transmitted, and symbol X indicates silence is being transmitted. In state 1 for example, idle characters are being transmitted on the primary output terminal while silence is being transmitted on the secondary output terminal.

Similarly in FIG. 1, a symbol in parentheses is adjacent each of the input terminals. That symbol indicates the character that must be received on the input terminal in order for a state change to occur. For example, the symbol (I) on the primary input terminal of state 1 indicates that a state change will occur if an idle character is received on that terminal.

When a state change does occur, the lines in FIG. 1 which interconnect one square to another show the cause of the change. For example, the line which interconnects square 1 to square 3 indicates that a change from state 1 to state 3 occurs when idles are received on the primary input terminal. Similarly, the line which interconnects square 1 to square 2 indicates that a change from state 1 to state 2 occurs when idles are received on the secondary input terminal.

Of particular importance in this invention are the state changes which are caused by the occurrence and detection of an error. In FIG. 1, such an error is indicated by the symbol ERR as being detected in state 9 and causing a transition from that state to state Q3. Many types of errors (i.e., either of a hardware nature or a software nature) can cause this transition.

For example, suppose that under normal operating conditions, each station in state 9 passes messages which are not to exceed a certain length, and these messages are spaced by idle characters which also are not to exceed a certain length. Under such conditions, one error that would cause a transition to state Q3 would be the receipt of a message which exceeds the length limit (e.g., the adjacent station could be "stuck" sending a message).

Another error would be the receipt of the idle characters in excess of the length limit (e.g., the adjacent station could be "stuck" sending idles). Still another error that will cause the transition from state 9 to state Q3 is the nonconformance of the messages to some pre-established format (e.g., the receipt of two messages without any intervening idle characters).

In state Q3, all intercoupling of messages through the station is terminated, and silence is transmitted on both the primary and secondary output terminals. This silence is then detected by adjacent stations, which respond by entering either state Q1 or Q2. State Q1 is entered when silence is detected on the secondary input terminal; whereas state Q2 is entered where silence is detected on the primary input terminal.

In states Q1 and Q2, all intercoupling of messages through the station is terminated, and silence is transmitted from the station's primary and secondary output terminals. This silence is then detected by the adjacent stations and causes them to enter states Q1 or Q2. Thus the sequence of detecting and transmitting silence continues until all the stations on the network have entered one of the Q states.

After the Q are entered, the stations on the network begin to recouple themselves together by passing into state 1 and then through some of the states 2 thru 9. State 1 is entered from state Q1 by receiving silence on the primary input terminal or by continuously receiving any signal except silence on the primary input terminal for a selected time interval. Symbol TMOP indicates such a "time-out" on the primary input terminal.

From state Q2, state 1 is entered by receiving silence on the secondary input terminal or by continuously receiving any signal except silence on the secondary input terminal for a selected time interval. Symbol TMOS indicates such a "time-out" on the secondary input terminal. And, from state Q3, state 1 is entered by continuously receiving any signal except silence on both the primary and secondary input terminals for a selected time interval. This is what is indicated by the symbol TMOPS.

Note that the series of transitions through the Q states need not always be initiated by a transition from state 9 to state Q3. Such a series can also be initiated by the detection of silence in states 4, 6, 7, 8, or 9. From states 6, 8 and 9, silence on the primary input terminal causes a transition to state Q2; whereas in states 4, 7 and 9, silence on the secondary input terminal causes a transition to state Q1. Such silence could be due to a broken interstation coupling, a broken transmitter, etc.

Figure 2:
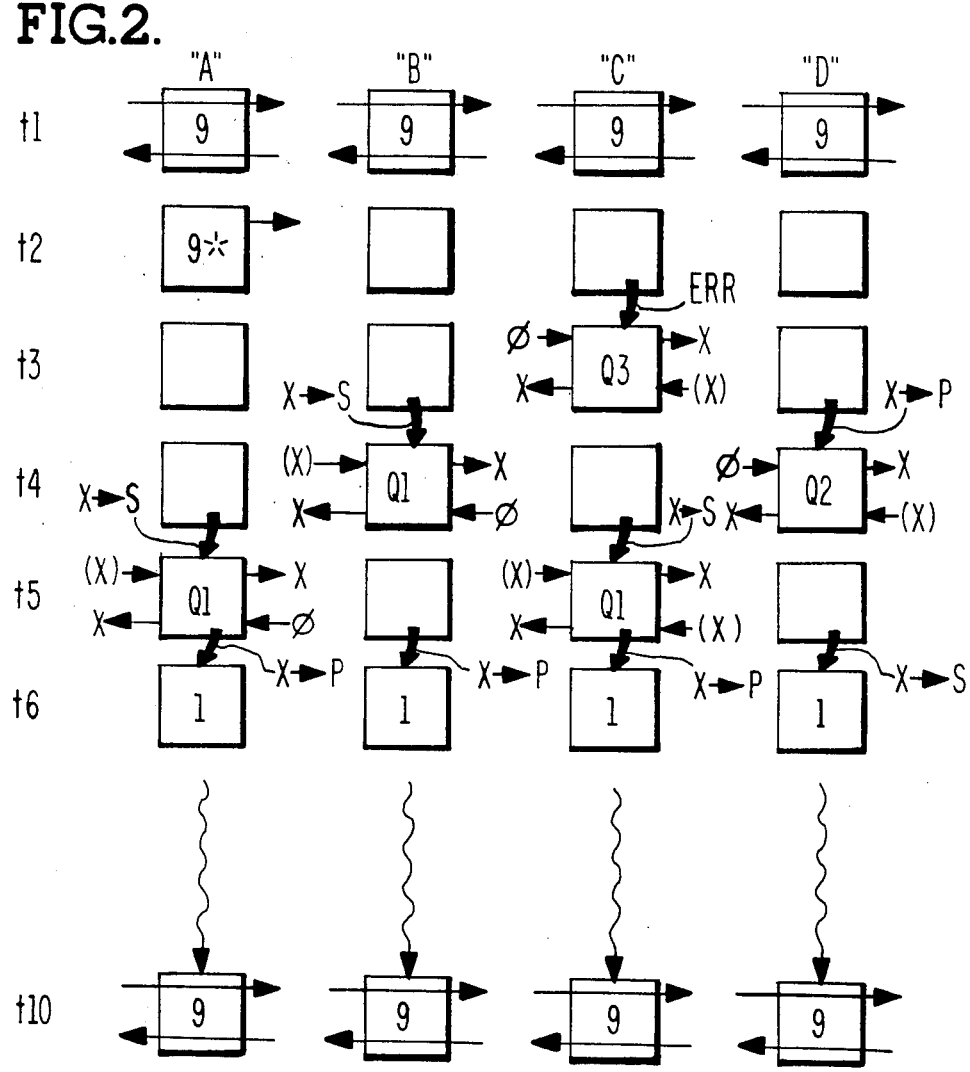
FIG. 2 illustrates the sequence by which four stations which are constructed in accordance with FIG. 1 respond to an error in the format of the messages that are passed through the network.

Consider now FIG. 2 which shows an example of a communication network having four stations A, B, C, and D that operate as described above. In this example, at time $t_1$, all of the stations on the network are in state 9, and messages are being passed from station to station in a normal operating fashion. Subsequently, at time $t_2$, an error occurs in the transmissions from the primary output terminal of station A as indicated by the symbol 9*. For example, this error could be a nonconformance to some pre-established format for the messages.

Suppose now that this error is not detected by station B (i.e., the station which is next to the error producing station) but instead the error is detected by station C. This detection of the error causes station C to make a state transition at time $t_3$ to state Q3. In that state, station C breaks its internal coupling and transmits silence on both its primary and secondary output terminals.

Consequently, at time $t_4$, station D receives silence on its primary input terminal. Thus station D makes a transition to state Q2. Similarly, at time $t_4$, station B receives silence on its secondary input terminal, so station B makes a transition to state Q1.

When station B enters state Q1, it transmits silence on both its primary and secondary output terminals, and when station D enters state Q2, it also transmits silence on both its primary and secondary output terminals. As a result, station A receives silence on its secondary input terminal and enters state Q1 at time $t_5$, and station C receives silence on its secondary input terminal and enters state Q1 at time $t_5$.

Then at time $t_5$, station A detects silence on its primary input terminal so it enters state 1. Stations B and C operate in the same fashion. And station D detects silence on its secondary input terminal so it enters state 1. Then from state 1, all of the stations begin to reform the coupling between stations by passing through states 2, 3, 4, etc., and finally ending up in state 9.

One feature of the above described sequence is that station C was able to initiate the recovery of an error that was caused by station A even though station C had no information as to which station caused the error. An unworkable process for recovering from this problem would be for station C to send a message to its neighbor station B by saying that it is generating erroneously formatted messages. Station B is not the source of the error; and further, the severity of the format error could prevent station C from sending any message at all.

Figure 3:
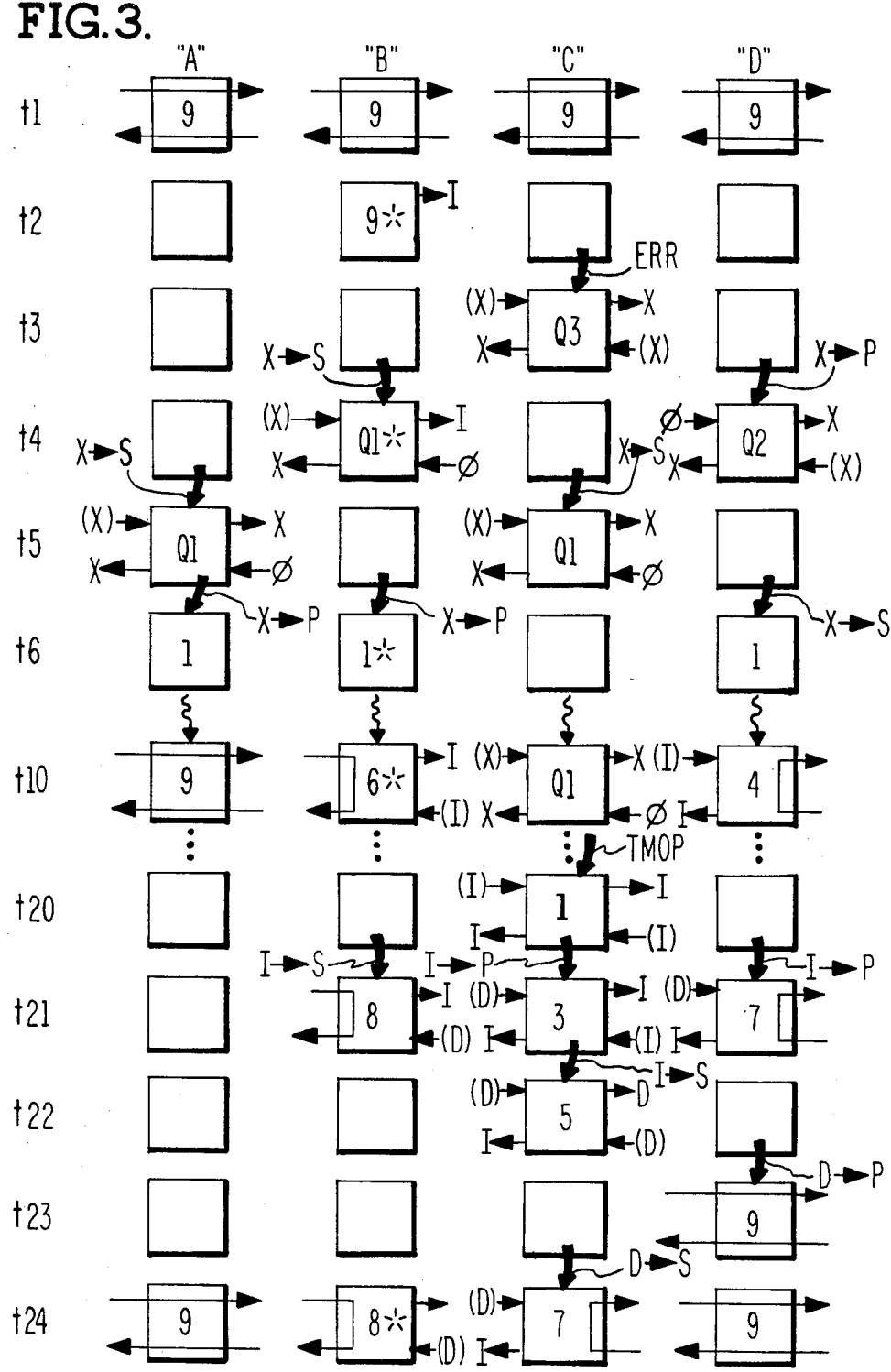
FIG. 3 illustrates the sequence by which four stations which are constructed in accordance with FIG. 1 respond to an error in which one of the stations is "stuck" sending idle characters.

Turning now to FIG. 3, another example will be described which further illustrates the operation of the invention. In this example, there again are four stations A, B, C and D, each of which is constructed to operate in conformance with the FIG. 1 state diagram. At time $t_1$, all the stations are in state 9 which is their normal operating mode.

Subsequently, at time $t_2$, an error occurs in station B as indicated by the symbol 9*. In this example, the error causes station B to continuously transmit idle characters from its primary output terminal (i.e., a "stuck-at" error). This error is detected in station C and causes that station to make a transition to state Q3 at time $t_3$.

In state Q3, station C transmits silence on both its primary and secondary output terminals. Consequently, station D receives silence on its primary input terminal; so it makes a transition to state Q2 at time $t_4$. Similarly, station B receives silence on its secondary input terminal; so it makes a transition to state Q1 at time $t_4$. However, note that by definition, station B is stuck sending idle characters from its primary output terminal, and this "stuck-at" condition continues in state Q1 at time $t_4$.

In state Q2, station D transmits silence on its secondary output terminal. That silence is then detected by station C; and so station C makes a transition to state Q1 at time $t_5$. Similarly, station B transmits silence on its secondary output terminal; station A detects that silence; and so station C makes a transition to state Q1 at time $t_5$.

Thereafter, at time $t_6$, stations A and B detect silence on their primary input terminal. So they make a transition to state 1. Similarly, station D detects silence on its secondary input terminal, so it makes a transition to state 1. Thus, at time $t_6$, all of the stations except station C are in state 1. Station C would enter state 1 if it received silence on its primary input terminal; however, this will not occur because by definition, station B is "stuck" and continuously transmits idle characters from its primary output terminal.

After time $t_6$, stations A, B and D progress from state 1 to states 9, 6, and 4 respectively. These stations are shown as having reached their final state at time $t_{10}$. At that time, messages are transmitted in a loop through stations A, B, and D while station C remains in state Q1.

Stations A, B, C and D remain in their respective states as shown at time $t_{10}$ until station C times-out. That is, after station C continuously receives any signal except silence on its primary input terminal for a selected time period, it makes a transition to state 1. This is shown as occurring at time $t_{20}$.

Upon entering state 1, station C transmits idle characters to its two neighbor stations and monitors their response. This response causes station C to move through states 3 and 5 and stop in state 7. At the same time, station D moves from state 4 through state 7 and stops in state 9. These state transitions are shown in detail as occurring at times $t_{20}$ thru $t_{24}$. And at time $t_{24}$, all the stations reach their final state.

A preferred method of recovering from transmission errors in a local area network has now been described in detail. In addition, however, many changes and modifications can be made to these details without departing from the nature and spirit of the invention.

For example, a wide variety of logic circuits can be constructed to carry out the steps that are illustrated in FIG. 1. Suitably, those steps are performed by a microprocessor such as an Intel 8088 chip. Alternatively, the FIG. 1 steps are performed by a special purpose logic circuit. How to build such a sequential logic circuit given its state diagram is taught by the text *Finite-State Models for Logical Machines* by Frederick C. Hennie, 1968, published by John Wiley & Sons, Inc., Library of Congress #67-29935.

Also, various waveforms can be employed for the idle characters, delimiter character, and messages. Suitably, an idle signal (I) is an unmodulated carrier; and a delimiter signal is a carrier that is modulated in a certain fashion. Silence (X) is the absence of any signal on an input terminal.

Accordingly, since many such variations and modifications can be made to the above details, it is to be understood that the invention is not limited to those details but is defined by the appended claims.

What is claimed is:

1. A method of recovering from an error in a station having first and second input-output ports which are respectively coupled to two other stations in a communication network; said method including the steps of:
    receiving on said first port, messages which are separated by idle characters and regenerating same on said second port;
    detecting said error during said receiving step; and
    responding to the detection of said error by (a) transmitting silence on both said first and second ports and (b) waiting for a predetermined response on said ports to said transmitting of said silence, prior to passing any further messages through said station.

2. A method according to claim 1 wherein said detecting of said error includes detecting the continuous receipt of said idle characters on said first port in excess of a certain limit.

3. A method according to claim 1 wherein said detecting of said error includes detecting the continuous receipt of a message on said first port in excess of a certain limit.

4. A method according to claim 1 wherein said detecting of said error includes detecting the interruption of either said idle characters or said messages with the receipt of silence on said first port.

5. A method according to claim 1 wherein said messages have a pre-established format, and said detecting of said error includes detecting a nonconformance to said format.

6. A method according to claim 1 wherein said predetermined response includes receiving silence on both said first and second ports.

7. A method according to claim 1 wherein said predetermined response includes receiving silence on one of said ports and continuously receiving any signal except silence on the other port for a selected time interval.

8. A method of recovering from an error in a station having first and second input-output ports which are respectively coupled to two other stations in a communication network; said method including the steps of:
    receiving on said first port, messages which are separated by idle characters and internally coupling same through said station to said second port;
    detecting an error during said receiving step; and
    responding to the detection of said error by breaking said internal coupling and transmitting silence on both said first and second ports.

9. A method according to claim 8 and further including the step of receiving silence on both said first and second ports as a precondition to reestablishing said internal coupling.

10. A method according to claim 8 and further including the step of receiving silence on one of said ports and continuously receiving any signal except silence on the other port for a selected time interval as a precondition to establishing said internal coupling.

11. A method of recovering from an error in a station having first and second input-output ports which are respectively coupled to two other stations in a communication network, said method including the steps of:
    receiving signals on said first port, and internally coupling same through said station to said second port;
    detecting an error condition in said signals; and
    responding to the detection of said error by breaking said internal coupling and transmitting silence on both said first and second ports.

* * * * *